United States Patent [19]

Sandor et al.

[11] Patent Number: 5,330,799
[45] Date of Patent: Jul. 19, 1994

[54] PRESS POLYMERIZATION OF LENTICULAR IMAGES

[75] Inventors: Ellen R. Sandor, Chicago; William T. Cunnally, Island Lake; Stephan B. Meyers, Chicago, all of Ill.

[73] Assignee: The Phscologram Venture, Inc., Chicago, Ill.

[21] Appl. No.: 945,139

[22] Filed: Sep. 15, 1992

[51] Int. Cl.$^5$ .......................... B05D 3/06; B05C 9/08
[52] U.S. Cl. ..................... 427/510; 427/162; 118/212; 118/407; 118/620; 264/1.3
[58] Field of Search ............... 427/555, 162, 256, 288, 427/510; 264/1.3; 118/212, 620, 407; 359/463, 619

[56] References Cited

U.S. PATENT DOCUMENTS

| | | |
|---|---|---|
| 666,424 | 1/1901 | Ives . |
| 725,567 | 4/1903 | Ives . |
| 1,260,682 | 3/1918 | Kanolt . |
| 2,829,051 | 4/1958 | Gretener et al. . |
| 3,146,492 | 9/1964 | Lemelson . |
| 3,213,753 | 10/1965 | Rogers . |
| 3,240,932 | 3/1966 | Haines . |
| 3,241,429 | 3/1966 | Rice et al. . |
| 3,250,173 | 5/1966 | Henry . |
| 3,259,499 | 7/1966 | Thommes . |
| 3,264,164 | 8/1966 | Jerothe et al. . |
| 3,275,494 | 9/1966 | Brunson et al. . |
| 3,294,532 | 12/1966 | Brunson et al. . |
| 3,306,974 | 2/1967 | Cunnally . |
| 3,332,775 | 7/1967 | Mandler . |
| 3,385,721 | 5/1968 | Leach . |
| 3,441,939 | 4/1969 | Anderson . |
| 3,458,348 | 7/1969 | Sherman . |
| 3,530,779 | 9/1970 | Alofs . |
| 3,538,198 | 11/1970 | Montebello . |
| 3,565,733 | 2/1971 | Leach . |
| 3,595,943 | 7/1971 | Brunson et al. . |
| 3,642,346 | 2/1972 | Dittmar . |
| 3,684,348 | 8/1972 | Rowland . |
| 3,772,465 | 11/1973 | Vlahos et al. . |
| 3,953,869 | 4/1976 | Wah Lo et al. . |
| 3,973,957 | 8/1976 | Montgomery . |
| 3,980,476 | 9/1976 | Wysocki . |
| 4,092,173 | 5/1978 | Novak et al. . |
| 4,120,562 | 10/1978 | Lo et al. . |
| 4,129,628 | 12/1978 | Tamutus . |
| 4,158,501 | 6/1979 | Smith et al. . |
| 4,276,367 | 6/1981 | Merrill et al. . |
| 4,414,316 | 11/1983 | Conley . |
| 4,420,502 | 12/1983 | Conley . |
| 4,420,527 | 12/1983 | Conley . |
| 4,468,115 | 8/1984 | Lao . |
| 4,481,050 | 11/1984 | Gundlach et al. . |
| 4,557,954 | 12/1985 | Gundlach et al. . |

(List continued on next page.)

FOREIGN PATENT DOCUMENTS

| | | | |
|---|---|---|---|
| 51-91718 | 8/1976 | Japan . | |
| 51-98026 | 8/1976 | Japan . | |
| 58-144878 | 8/1983 | Japan | 264/1.3 |
| 62-133403 | 6/1987 | Japan | 427/162 |

*Primary Examiner*—Terry J. Owens
*Attorney, Agent, or Firm*—Kirkland & Ellis

[57] ABSTRACT

Methods and apparatus for producing autostereograms using ultraviolet radiation-curable thermosetting polymers. A stereoscopic image is printed upon a plastic or paper sheet, which is fed directly onto a surface having an inverse lenticular pattern relief. As the sheet is fed onto the surface, a flow of ultraviolet-curable thermosetting polymer resin is directed at the surface. Ultraviolet radiation is directed at the polymer layer, curing the polymer and forming a lenticular array on the front surface of the polymer layer. During this process, the sheet carrying the stereoscopic image is bonded to the back surface of the polymer lenticular layer in precise registration with the lenticular array. In a preferred embodiment of the invention, the inverse lenticular pattern relief is on the outer surface of a transparent cylinder. The polymer layer is cured as it is flowed onto the relief pattern by an ultraviolet lamp placed within the transparent cylinder.

34 Claims, 6 Drawing Sheets

U.S. PATENT DOCUMENTS

| | | |
|---|---|---|
| 4,596,458 | 6/1986 | Gundlach . |
| 4,600,297 | 7/1986 | Winnek . |
| 4,719,615 | 1/1988 | Feyrer et al. . |
| 4,780,867 | 10/1988 | Lind et al. . |
| 4,825,430 | 4/1989 | Halter et al. . |
| 4,836,874 | 6/1989 | Foster ................................. 264/1.3 |
| 4,852,075 | 7/1989 | Feyrer et al. . |
| 4,853,769 | 8/1989 | Kollin . |
| 4,896,314 | 1/1990 | Skiens et al. . |
| 4,901,304 | 2/1990 | Lind et al. . |
| 4,903,069 | 2/1990 | Lam . |
| 4,912,696 | 3/1990 | Feyrer et al. . |
| 5,003,915 | 4/1991 | D'Amato et al. .................... 118/212 |
| 5,075,060 | 12/1991 | Imataki ................................ 264/1.3 |
| 5,113,213 | 5/1992 | Sandor et al. . |
| 5,116,548 | 5/1992 | Mallik et al. ......................... 427/162 |
| 5,121,343 | 6/1992 | Faris . |
| 5,164,227 | 11/1992 | Miekka et al. ....................... 264/1.3 |

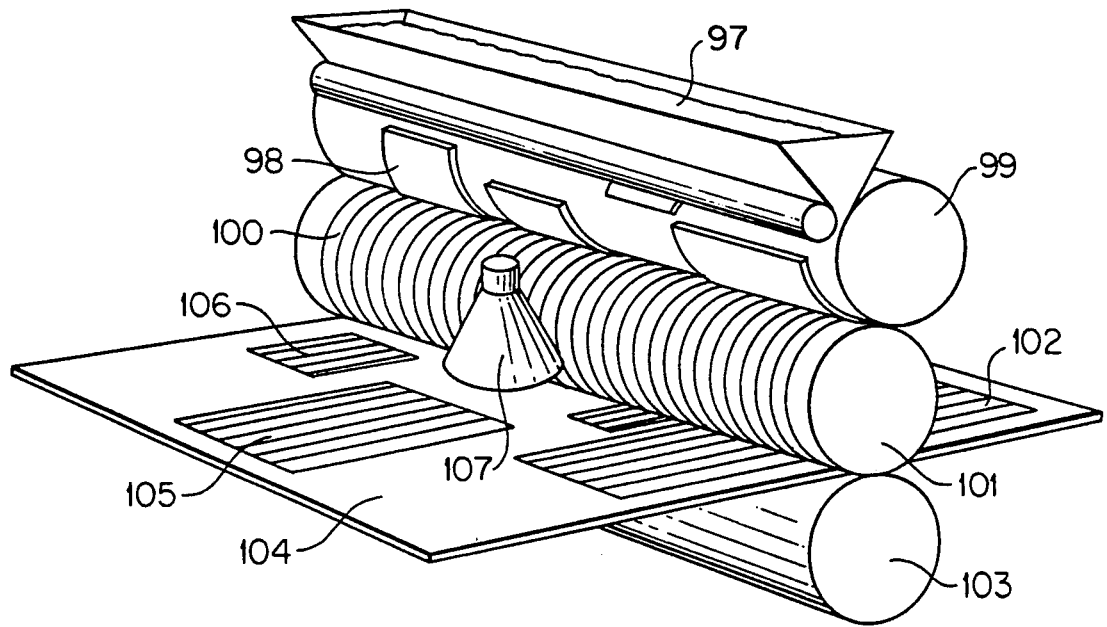
FIG. 7a
FIG. 12
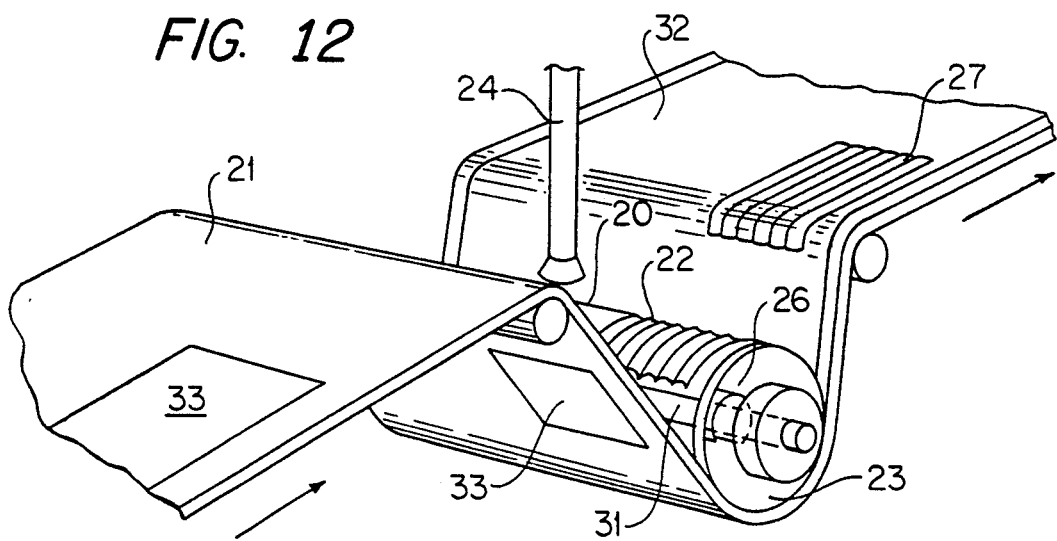

PRESS POLYMERIZATION OF LENTICULAR IMAGES

BACKGROUND

1. Field of the Invention

The present invention relates to autostereoscopic and related images produced by concurrently printing images on paper or plastic and fabricating a lenticular polymer lens surface, The lenticular pattern is produced by applying a reactive polymer layer to the outer surface of a transparent cylinder having a lenticular pattern in relief on its outer surface and casting the pattern in registration with the image using radiation from an ultraviolet light source.

2. Background of the Invention

Autostereoscopic imaging is a technique for providing three-dimensional images. Autostereoscopic imaging is described in U.S. Pat. No. 5,113,213 to Sandor et al. This patent describes a method and apparatus for making autostereographic images by interleaving a number of images in a computer and printing the interleaved images on a printer. The specification, and drawings of this patent are incorporated herein by reference.

DEPTH PERCEPTION

Stereo vision results principally from three depth cues: binocular parallax, monocular movement parallax, and psychological factors. Binocular parallax is due to the spacing between the observer's left and right eyes. Because of the distance between the eyes, light rays from a given object enter the left eye at a slightly different angle than light rays from the same object enter the right eye. The brain integrates the two physical images received by the eyes into one perceived image. The brain deduces the distance to the object from the difference in the angles. The threshold distance for the minimum perception of binocular parallax is approximately 10 inches.

Monocular movement parallax arises from the shift in the image of an object as the angle from which that object is viewed changes. Monocular movement parallax can be perceived even from a single eye, as long as that eye is moving. The more rapidly the eye moves, the more acute the monocular movement depth perception becomes.

Psychological factors such as size, haze, and gradients in shading, shadows and texture also contribute to depth perception. We know the actual size of most objects from experience and memory. As an object recedes in the distance, the size of its image on an observer's retina becomes smaller. Therefore, the size of the image of a familiar object on the observer's retina is inversely related to the distance to the object. In still photography this principle can be employed to trick the viewer into believing that greater than actual depth is being perceived by reducing the size of background objects in the photograph.

The psychology of depth perception dates back to 280 A.D. when Euclid defined binocular parallax as the means by which each eye receives the simultaneous impression of two dissimilar images of the same object. This basic principle is applied today in methods of autostereography using lenticulated lens sheets or barrier strip systems which provide the optics necessary for the perception of depth, without the need for the observer to wear filters or glasses°

BACKGROUND OF 3-D IMAGES

With the invention of photography, it was discovered that two photographs of the same object taken from slightly different viewpoints, if presented to each eye as independent images, would produce a three-dimensional image. Several inventors in the 1800s developed hand held stereoscopes.

To present three-dimensional images to a large audience, a pair of stereoscopic images would be projected in two separate colors and viewed with glasses having complementary color filters over each eye. This anaglyphic method for viewing three-dimensional images with glasses was also used for early three-dimensional motion pictures and for printed images when filtered glasses could be provided. The common colors used for images and filters were red and blue or red and green: the red filter neutralizes the red images and the blue or green filter neutralizes the blue or green image. This approach could not be used for full color images.

When color film became available for motion pictures, the left and right images could no longer be separated using color filters. Polarization filters were developed to replace the color filters. However, polarized filters cannot be used for three-dimensional television, because the television screen cannot display polarized images. The most successful systems developed for three-dimensional television separate the images in time, instead of by polarization. These systems use a liquid crystal shutter on the televised image synchronized with shutters on the left and right eyes. However, this system requires the observer to wear liquid crystal shutters over the eyes synchronized with the left and right eye views of the CRT images.

The color, polarizer and shutter stereoscopic systems described above are not autostereographic systems because the observer must wear an optical devices such as eyeglasses having color filters, polarizers, or electronic shutters to perceive the three-dimensional image.

AUTOSTEREOGRAPHY

Autostereography was invented in 1908 by M. G. Lippman. Lippman developed the fly's-eye lens lenticular sheet. The lens sheet contained thousands of small convex lenses arranged either in a random or in an oriented array pattern. A photographic plate placed at the focal plane of the lenses was exposed through a large diameter lens to light reflected from an object. The film recorded the thousands of small photographs as a large integral photograph. A three-dimensional image could be perceived from any angle when a positive of the integral photograph was placed in exactly the same position relative to the convex lens array as the photographic plate. A second kind of autostereogram was developed to make the registration process less demanding. The arrays of convex lenses were replaced with planar arrays of cylindrical lenses. The cylindrical lenses preserved only the horizontal parallax information—the vertical parallax information was lost. Such an image could be viewed from left to right, but not up and down. This approach made registration easier, since only horizontal registration was required.

The lenses in the lenticular sheet were separated from the image by the remaining thickness of the lenticular sheet such that the lenses would focus on the image at the rear surface of the material. A photographic emulsion was placed against the rear surface of the sheet, and an exposure was made through the lenticular sheet. The image plane was moved horizontally during the exposure, resulting in fine columns of left and right eye images. This structure is perceived as a three-dimensional image when viewed through a lenticular screen.

Barrier strip stereograms are a third kind of autostereogram. In barrier strip autostereograms, images are viewed through fine transparent vertical slits in an opaque surface. Parallax factors affect barrier strip three-dimensional images in the same manner as lenticular lens sheets. Barrier strip stereograms must be illuminated from the rear, since ambient room light will not effectively illuminate the image from the front. The much brighter illumination is necessary because only 10–20% of the barrier strip is transparent—the remaining 80–90% is opaque.

Lenticular screen systems thus have an advantage over barrier strip systems, in that images in lenticular systems can be viewed in either the reflection or the transmission modes.

MANUFACTURE OF LENTICULAR SHEETS

The manufacture of lenticular sheets requires engraving a master relief pattern from which replications could be made. A number of conventional manufacturing methods have been adapted to produce lenticular sheets with the desired optical characteristics. These manufacturing methods include tooling, platen press, injection or compression molding, embossment, extrusion, and casting. The materials used include a variety of clear optical materials including glass and many types of plastics. Each of these prior art methods suffer inherent problems which render them ineffective for the high-volume production of lenticular screens for autostereography.

Machining can be used to directly manufacture coarse, one-of-a-kind large lenticular screens in thick plastic sheets. Milling machines or lathes can be used with a diamond tip tool having a pre-determined radius. However, machining is a slow and costly process. This method for manufacturing lenticular screens is not well-suited to volume production.

A platen press can be used to stamp or emboss an engraved relief pattern into a thermoset material. The temperature of the thermoset material is raised to soften the material so that it conforms to the engraved surface. The temperature of the material is reduced to harden the material such that it retains the relief pattern when removed from the platen press. Like machining, this method is slow and expensive. Furthermore, the sheet size is limited. This method is not suited for high volume production or for producing a continuous length product. Similar problems apply to injection or compression techniques for manufacturing molded lenticular screens.

The most common method for manufacturing high-volume lenticular sheets is by extrusion embossment in continuous length roll form. Typically, these systems utilize an engraved roller with a thread-like screw pitch to the relief pattern. The quality and definition of extrusion relief patterns are generally inferior to patterns obtainable by platen or ultra-violet casting methods.

Extrusion techniques have difficulty maintaining the absolute parallelism of the lenticular rows. Because of the elastic nature of the molten plastic material and the internal stresses imparted by the embossing roller, the sheet has a tendency to change from its impressed shape prior to being fully set. Additionally, extrusion lenticular sheets can streak due to condensation, adding to the dimensional distortion and migration of the lenticular surface. These physical distortions optical defects in the lenticular sheet result in serious distortions and degradations in the perceived image. Migration is the tendency of the extruded plastic to move in a direction perpendicular to the direction of lenticulation during the extrusion process.

The optical quality of extruded lenticular sheets also suffers from the influences of the polymers from which they are formed. Some extrusion systems attempt to control this problem by curtain coating the polymers to a pre-extruded non-lenticulated web sheet requiring a binder coating to produce the multi-layered ply-sheet. Curtain coating is a process in which a flow of liquid plastic is set by a chill roller. This does not control the migration problem and adds defects such as bubbles, separation of surfaces, and diffusion of images, thus reducing the optical quality of the lenticular sheet.

These problems were addressed by a photographic technique using a thermoset UV casted sheet developed in the 1980s. The technique used a composite sheet having a back surface coated with a photosensitive emulsion. The stereoscopic images were obtained as multiple exposures of the photosensitive emulsion through a lenticular screen. The composite sheet had a layer of cured thermosetting polymer on one surface of a base polymer film. The patterned lenticular relief was imposed upon the thermoset layer by curing the thermosetting resin while it is wrapped around a molding surface. The technique requires that it be used only with continuous roll transparent films. The disadvantage of this approach is that only special dedicated equipment could produce overall full-width lenticulated continuous roll transparent films.

The needs for printing applications are very different. Lenticulation is only required in the three-dimensional picture area of a sheet or page of a book, and not on the entire surface. When the lenticulation covers an area of text, the text becomes much harder to read. Additionally, fully lenticulated pages add an unnecessary cost to the finished product.

GEOMETRY OF THE LENTICULAR SHEET

The geometry of the lenticular sheet is determined by the conditions under which the image is obtained. To create autostereographic images, the object is photographed at two slightly different viewing angles, simulating the parallax created by the average 6.5 cm separation of two eyes. The difference in the viewing angles is determined by the distance from which the autostereoscopic display is to be viewed (the "viewing distance").

As the viewing distance increases, the pitch of the lenticular sheet becomes increasingly coarse and the thickness of the sheet increases in order to retain focus as the lens radius increases with pitch. The pitch is the number of lines per inch of the image. The format size of the image also generally increases with the viewing distance. Small hand-held lenticular sheet autostereographs require a very fine pitch, e.g., from 80 to 300 lines per inch. Larger lenticular screen autostereographs can have a pitch with as few as 10 to 40 lines per inch. As the cylindrical lenticules become smaller, in finer pitch lenticular screens, the thickness of the lenticular sheet is also reduced so that the lenticules can focus upon the back surface of the screen.

To produce high quality autostereographs, the lenticular sheet itself must have good depth resolution. Assume that the thickness of the lenticular sheet selected will allow a bundle of parallel incident beams of light to focus on the back surface of the sheet. The light beams thus form a single spot so that an observer cannot distinguish more than one spot inside any cylindrical lenticule from a given position. The width of the lenticule determines the minimum resolvable lateral picture element.

When lenticular screens are used with pre-established image pitches, such as in photo duplication or in printed images, the lenticules must be consistently and reliably identical and parallel, in order to register to the pre-established image. Lens aberrations, or variations in the thickness of the spacer sheet, may misdirect the outgoing beams, so that the perceived image is other than the defined image at a given viewing angle. However, when the lenticular screen is used with a photosensitive emulsion applied to the back side of the lens, and projections of the stereo images are made through the lens, most of the distortion due to migration or non-parallelism is self-cancelling.

Except for extreme variations, these distortions do not effect the photo-composed (one-of-a-kind) three-dimensional images. However, dedicated three-dimensional photography, photo-mechanical combinations or graphic arts separation and scanner-generated lenticular patterns require a standard pitch. The display lenticular screens must be made to conform exactly to the pitch and parallelism of the lenticular system used to generate the original image. Correction must also be made for the parallax angle when determining the pitch of the lenticular screen.

SUMMARY OF THE INVENTION

The present invention is an apparatus and method for the fabrication of lenticular sheets for use in autostereography.

In a first preferred embodiment of the present invention, the relief pattern is formed as an array of inverse lenticules around a quartz glass or other transparent type of cylinder. An ultraviolet (UV) lamp is placed at the center of the cylinder. The substrate for the lenticular screen is wrapped partially around the cylinder as a flow of UV-curable polymer is directed between the substrate and the cylinder. Air must be prevented from reaching the polymer because oxygen would inhibit the curing of the polymer. A typical polymer used in this apparatus can be cured at rates of 100 to 150 feet per minute with exposure to 200 to 400 watts of UV radiation per inch. A continuous web of substrate is fed around and onto the cylinder. The lenticular pattern is printed in-line just prior to the formation of the lenslets in the polymer over the printed image. A register line is printed at the edge of the substrate in alignment with the image and read by a sensor that adjusts the left-right movement of the cylinder to maintain registration of the lenticular pattern to that of the pre-printed image.

In the first preferred embodiment of the invention, the thermosetting polymer layer is an actively curable resin, which is cured and hardened by exposing the uncured thermosetting composition to active radiation while leaving the cast of the molding plate and impression cylinder of a web printing press. Furthermore, full curing of the sheet is accomplished in-line with the image printing. The resin only requires UV radiation for curing. Heating or chilling may be applied to control the viscosity of the polymer.

The lenticular sheets may be produced in continuous rolls or in individual sheets using a press slitter. The lenticular surface is applied to images being printed in-line in a single operation. This single-step procedure eliminates the need for adhesives and precise registration of the image and the screen, as required by the prior art. Furthermore, the invention can be practiced using existing offset printing equipment, a source of ultraviolet radiation, and special relief-patterned cylinders.

The relief pattern plate is formed with a pitch (i.e., lines per inch) that is compatible with the pitch of available graphic arts output devices such as laser scanners. The pitch of the plate is determined according to the following formula:

$$PITCH_{plate} = (PITCH_{scanner})/(number\ of\ images)$$

Because the pitch of the lenticular pattern is compatible with the output of the scanner, computer generated images are produced in exact registration with the lenticular screen.

The lens thickness and the lens curvature required to produce the proper focal length and sharpness of the image determine the correct pitch. Typically, printing presses are made to accept substrates approximately 20 mils thick. This leaves a wide range of pitches available for both thick and thin substrates. When printing on paper, with an 8 to 10 mils thick polymer layer, a pitch of 150 to 250 lines per inch would require a radius of from 2.67 mils to 3.33 mils with a depth of pattern less than 2 mils.

On plastic substrates, the pitch can be more coarse for a longer viewing distance, because the substrate itself provides the majority of the lens focal length. In this case, pitches as low as 80 lines per inch could be used with polymer overcoats less than 3 mils thick. The exact radius of the lens, thickness of the lenticular sheet and pitch of the lenticular pattern is determined by the refraction index of the polymer used (typical polymers used for the manufacture of lenticular sheets have an index of refraction of approximately 1.558). The viewing angle of the lenticule must be 30° degrees or more for proper movement of objects off-axis to the center plane of the image without objectionable flicker, sinuosity or ghosting.

The master relief patterned plate is made using a cutting tool conformed to the desired radius of the lenticule. The cylinder is made as a replication of the end product with the radius tool indenting the lens edges into the surface rather than having the sharp edges protruding from the surface. The circumference of the cylinder is equal to the height of the image, and the width is equal to the width of the image. With a plastic substrate, a pitch of 162 lines per inch will yield a lenticular screen which is 20 mils thick overall, each lenticule being 6.1728 mils wide and having a radius of 6.67 mils. A base sheet 15 mils thick would require a cured thermosetting polymer layer 5 mils thick opposite to the image side. With a paper substrate, a polymer thickness of 8 mils would require a radius of 2.67 mils at a pitch of 250 lines per inch. A compromise lenticular relief patterns that could be used with either paper or plastic substrates would have a pitch of 162 lines per inch, with the lenticles having a radius of 4.17 mils. This pattern would be used with a 10 mil thick base sheet for plastic substrates (for a total thickness of 12.5 mils), and a 12.5 mil thick base sheet for paper substrates.

A further significant feature of the present invention is that it eliminates all secondary operations required by the prior art. No adhesives, mounting, registration, or optical alignments are necessary. In a single operation, three-dimensional or multi-images can be printed on available substrates with the added lenticular layer being formed substantially bonded to the substrate as the layer is cast and cured in registration with the images being printed.

It is an object of the present invention to provide a method and apparatus for concurrently printing stereographic images in-line with the formation of a lenticular screen.

It is a another object of the present invention to eliminate distortions in lenticular autostereographic displays.

It is a further object of the present invention to provide autostereographs that can be specifically tailored for use in printed media such as illustrated books.

These and other objects of the present invention are described in greater detail in the detailed description of the invention, the appended drawings and the attached claims.

BRIEF DESCRIPTION OF THE DRAWINGS

FIG. 7a is a perspective view showing how flowable polymer resin is applied according to one method of the present invention.

FIG. 12 is a perspective view of a commercial web press coating unit adapted to practice the present invention.

DETAILED DESCRIPTION OF THE INVENTION

Figure 1:
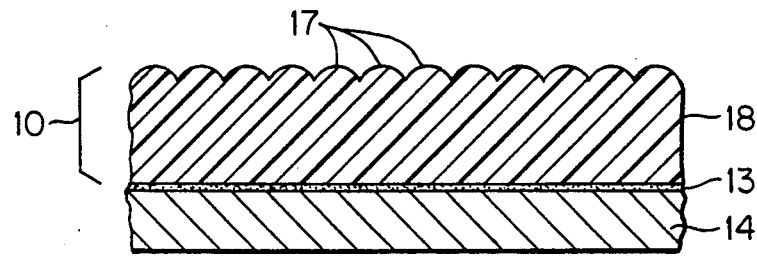
FIG. 1 is a schematic representation of a cross-section of one type of lenticular screen fabricated according to the present invention.
Figure 2:
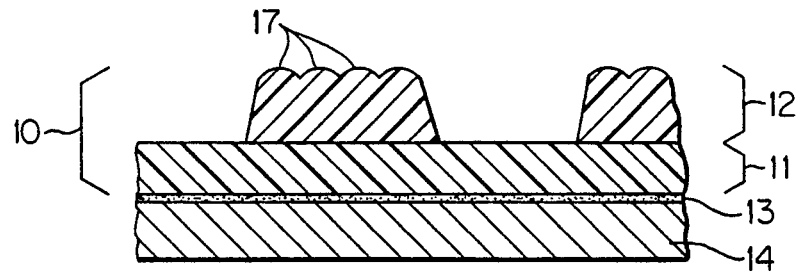
FIG. 2 is a schematic representation of a cross-section of a second type of lenticular screen fabricated according to the present invention.

FIGS. 1 and 2 show two lenticular sheets manufactured according to the present invention. Both these lenticular sheets use an opaque paper or plastic layer to carry the image. These lenticular sheets must be used in the reflection mode, i.e. the viewing light enters the lenticular sheet from the front surface, and is reflected back out by an opaque image-bearing layer. FIG. 1 is a cross-section of the lenticular sheet, showing thermosetting polymer layer 10, binder coating 13, base substrate 14 and lenticles 17. Base substrate 14 has substantially smooth front and rear planar surfaces. Binder coating 13, which is optional, is a polymethyl acrylic such as National Chemical Company's NICOAT coating.

In the lenticular sheets illustrated in FIGS. 1 and 2 a complementary lenticulated image is printed on the top surface of substrate 14. This printed surface is positioned at the focal point of the lenticles 17 formed on the top surface of polymer layer 10. In this embodiment the image is printed on a paper layer or other opaque stock.

The lenticles 17 are elongated, parallel, rib-like cylindrical lenses having a narrow width and a uniform size and shape. The lenticles may extend over all the surface as shown in FIG. 1, or over only part of the surface as in FIG. 2. Each individual lenticule 17 in polymer layer 10 defines an elongated substantially cylindrical lens having a predetermined focal length. The focal length of the lenticles is located at the rear surface of the polymer being cured, i.e., at layer 13 of FIGS. 1 and 2.

The focal length is determined by the width and radius of curvature of the lenticles, and the index of refraction of the polymer layer. The index of refraction of the polymer layer is generally about 1.558. Typically, the width of each individual lenticule is 4–16 mils providing 60 to 250 lines per inch. The thickness of the polymer layer depends upon the radius of curvature of the lenticule and the index of refraction of the polymer. The thickness typically ranges from 6 to 10 mils. The polymer layer can be deposited onto the substrate in several layers. For example, FIG. 2 shows a polymer layer formed by depositing a first layer 11 over the entire surface of substrate 14 and then a second layer 12 over only part of the substrate. However, several layers may be deposited sequentially over the entire substrate to build up the proper focal distance between the lenticles 17 and the image plane at 13.

Figure 3:
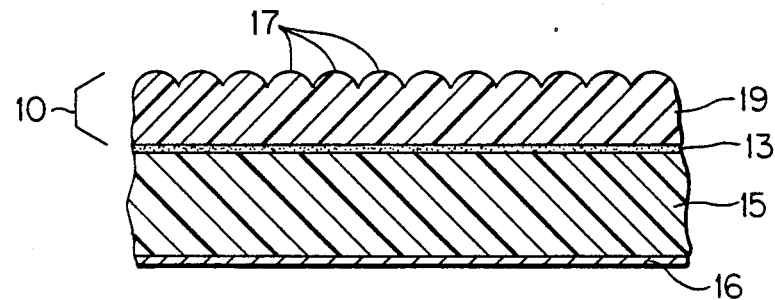
FIG. 3 is schematic representation of a cross-section of a third type of lenticular screen fabricated according to the present invention.

FIG. 3 is a cross-section of a back-lighted transmission mode lenticular sheet. It differs from the reflection mode lenticular sheet of FIG. 1 primarily by having a transparent plastic base film 15. The thickness of plastic base layer 15 may range from 8 to 20 mils. For the particular end use applications illustrated herein, the thickness of the base film is greater than the overall thickness of the thermosetting polymer layer 19. A bonding coating 13 of polymethyl acrylic may be applied using a prior press unit if required.

The image 16 is printed on the back side of base layer 15 in four or eight colors, depending on the required saturation needed, with one or two layers of opaque white ink to act as a diffusion surface or to act as a white backing for reflected images. Thermosetting polymer layer 19 is bonded to the top of base layer 15 using bonding coating 13. Base layer 15 is preferably a molecularly oriented thermoplastic polymer having good strength and dimensional stability such as the properties found in polycarbonates.

Examples of materials suited for use as a base layer 15 include polycarbonate (Lexan TM or Merlon TM), and polyesters, such as polyethylene terephthalate (e.g., Mylar TM). This type of molecularly oriented film is used because of its excellent strength and dimensional stability as well as its transparency, index of refraction and uniform overall thickness or caliper. Additionally, it has been found that excellent bond strength can be achieved between the polycarbonate or polyester base layers 15 and thermosetting polymer layer 19, especially when the surface is coated with a bonding layer 13.

Figure 4:
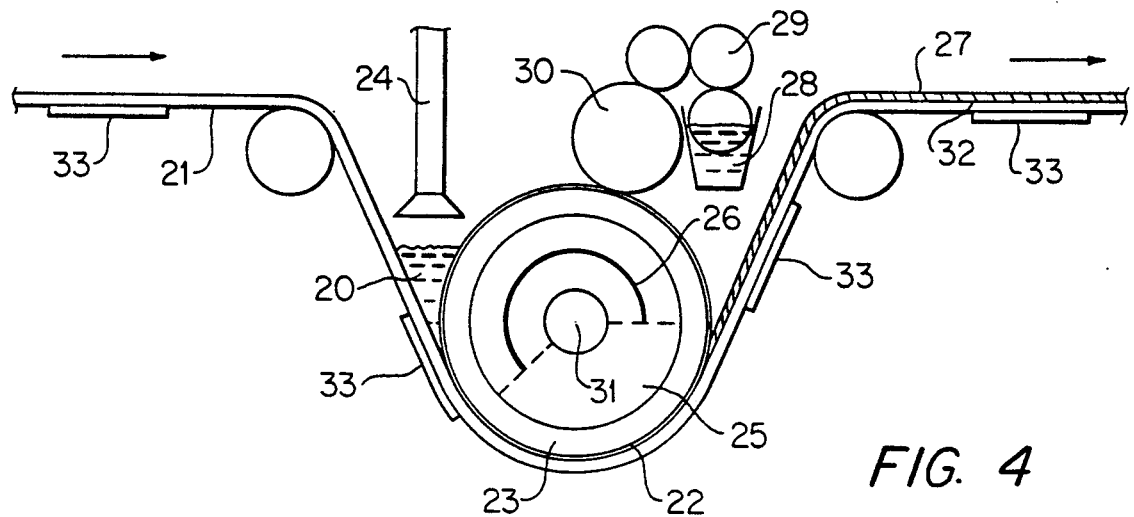
FIG. 4 is a schematic representation of a commercial web press coating unit adapted to practice the present invention.

The method of making the lenticular relief pattern is shown schematically in FIG. 4 and in the perspective view FIG. 12. This method uses a coating station unit typical of a narrow web printing press. The flowable uncured thermosetting resin is pumped into a reservoir trough 20 between the substrate layer 21 and relief pattern 22 on the surface of quartz glass cylinder 23. The resin flow is metered at the end of supply tube 24 to provide the proper amount of polymer resin, thus maintaining constant coverage of the relief pattern 22. The proper flow rate depends upon the rate of operating speed at the press print stations.

The thermosetting polymer is thus transferred from trough 20 to relief pattern 22 on the surface of transparent, e.g., quartz or glass, cylinder 23. The cavities of the inverse lenticular surface of relief pattern 22 uniformly fill with the polymer resin while maintaining the desired coating thickness. The resin 20 is formed into a lenticular pattern by the pressure between quartz glass cylinder 23 and substrate 21. To provide the additional thickness of the polymer layer required for proper focus, the pattern 22 on cylinder 23 retains a depth, in addition to the cavities required to form the lenticules themselves, equal to the focal length of the lenticules. The polymer is then exposed to ultraviolet radiation emitted by UV lamp 31. The UV radiation cures the polymer resin, so that it hardens and bonds to the substrate. UV lamp 31 is mounted within transparent cylinder 23 with gap 25 and reflector 26. Reflector 26 focusses the UV radiation onto the casting area of relief pattern 22. Substrate 21 is then separated from relief pattern 22 in exact registration with the printed image 23.

The thermosetting polymer layer can be applied to images printed on paper (for reflection mode viewing as in FIG. 1) or to images printed on clear transparent plastic sheets (for transmission mode viewing as in FIG. 3, and as shown as printed areas 33 in FIGS. 4 and 12).

The resulting lenticular sheet has excellent dimensional stability and excellent resistance to solvents, staining and heat. Furthermore, the lenticular formations are an exact reproduction of the molding surface and have significantly better definition and lens like qualities than lenticular formations produced in a thermoplastic extrusion process by conventional prior art thermal embossing techniques. The fine and accurate definition of the lenticular formation is permanent and stable and does not change with time or as a result of the application of heat, as in the lenticular formations which are formed in the extrusion process. Since the resin is cured in situ, there are no stresses imparted to the resin as in an embossing operation. The cured resin layer is thus essentially unstressed and has no molecular orientation. Lenticular thermolens sheets produced according to the present invention also avoid the problems of pattern migration, watermarks and bubbles which occur during cooling and condensation of heat-embossed lenticular screens.

Figure 5:
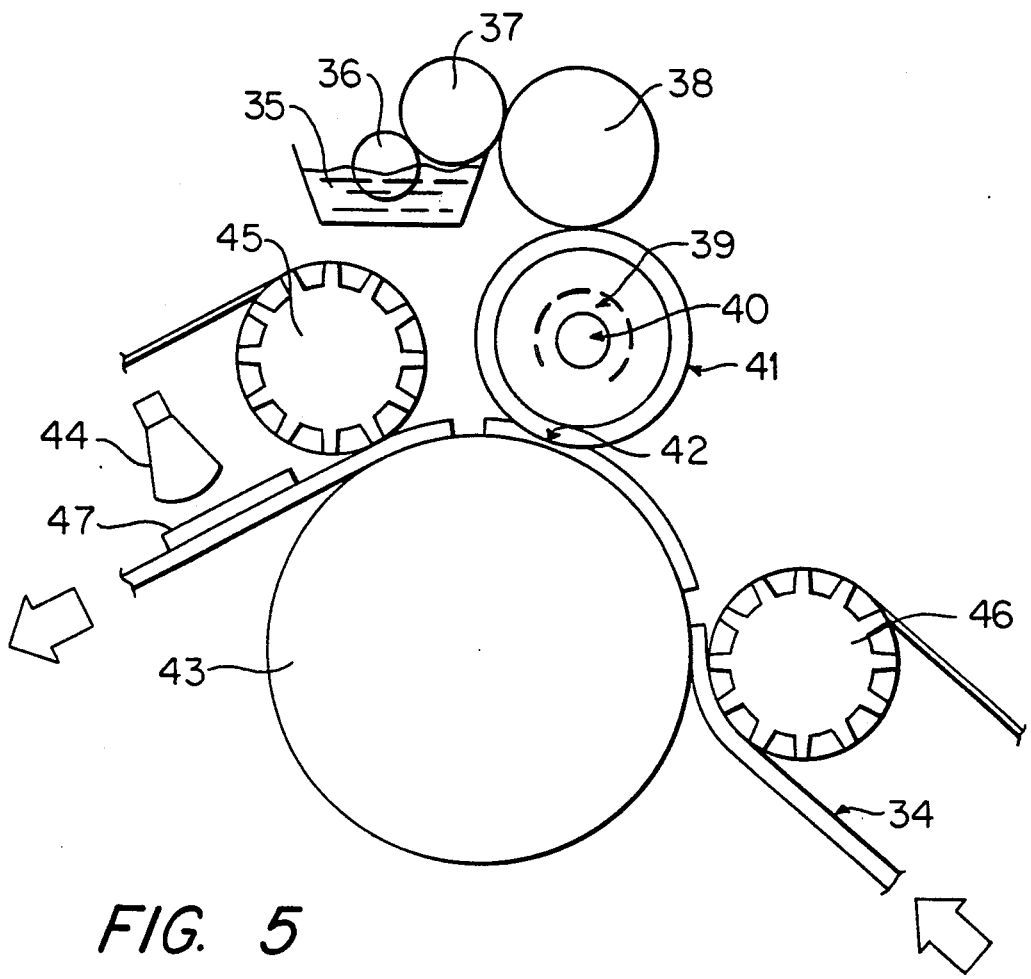
FIG. 5 is a schematic representation of a commercial tower coater adapted to practice the present invention.
Figure 11:
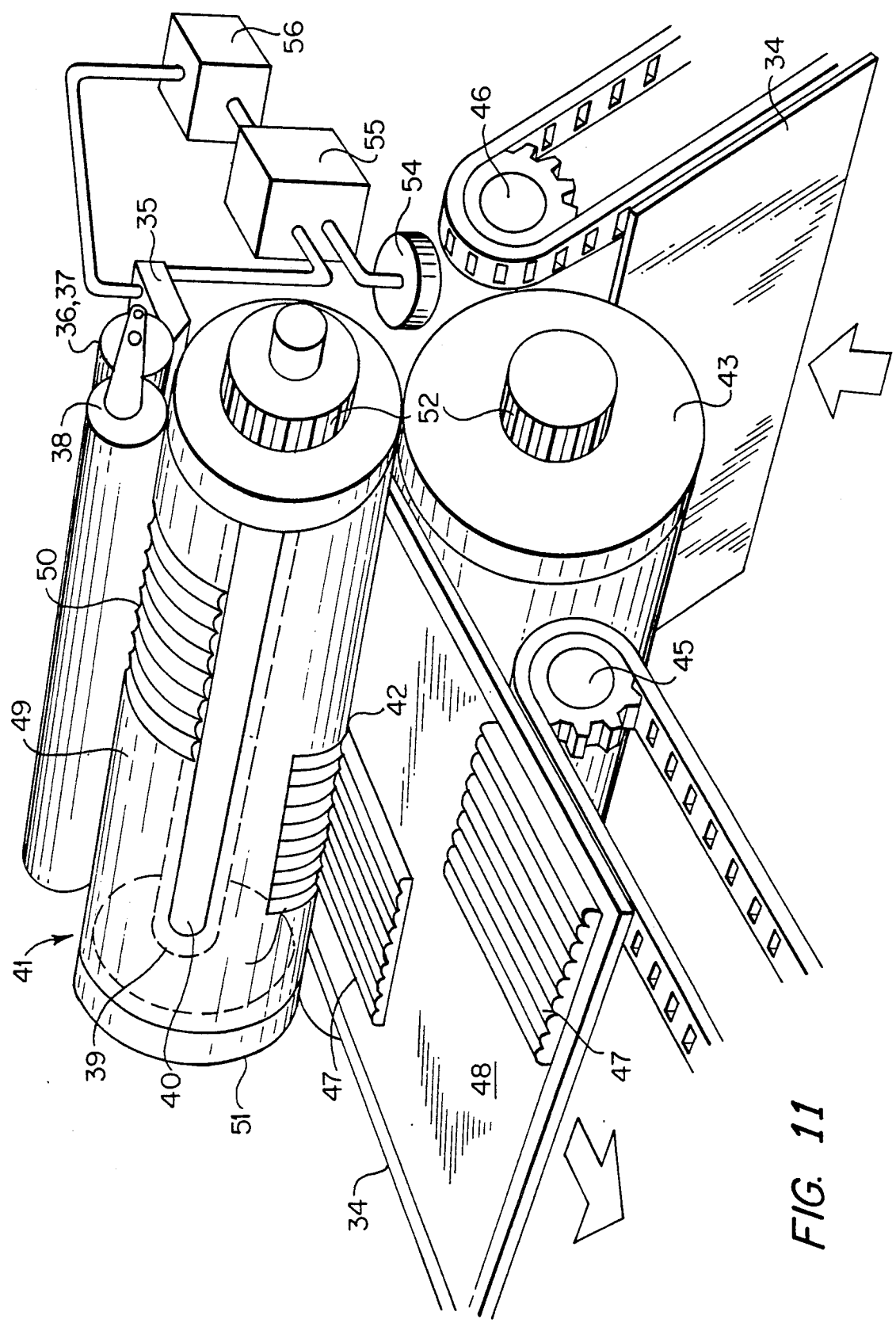
FIG. 11 is a perspective view of a commercial tower coater adapted to practice the present invention.

FIG. 5 and the perspective view in FIG. 11 show the use of a tower coater in a first preferred embodiment of the present invention. Tower coaters are commonly used with newer offset lithographic printing presses. Tower coaters provide "instant dry" in-line dispersion coatings applied on top of wet inks. Dual applications of an aqueous coating followed by a UV overcoat for gloss or protection of the printed image are often applied with interstation drying between units. Evaporation of water or solvents can be enhanced with infrared and hot-air dryers.

Coaters come in three varieties: dampener coaters, using a conventional press unit to track solid coating areas to the press blanket and subsequently to the printed sheet as the last impression before drying, and in a perspective view (FIG. 11), tower coaters built into the press as shown in FIG. 5, and retractable blanket or impression cylinder coaters. The latter may be used to apply coatings to the back surface of the lenticular sheets used in the reflection mode.

FIG. 5 and the perspective view FIG. 11 illustrate the use of a tower coater as a means for producing the thermolens sheet of this invention. As illustrated in FIGS. 5 and 11, thermosetting resin flows from hopper 35 via rollers 36, 37, 38 to the flat surface 49 (shown in FIG. 11) or recessed patterns 50 (shown in FIG. 11) of cylinder 41 and is then transferred to the substrate 34 at the cylinder nip 42 where the two cylinders meet. The polymer is formed at the nip 42 of pattern plate 50 and substrate 34 under the pressure of cylinder 43. The polymer is then cured with UV lamp 40 within cylinder 41. The polymer may be further cured using auxiliary UV lamps 44. Chain drives 45 and 46 deliver the sheet to and from the coater. As shown in FIG. 11, a temperature control "chiller" 55 is used to control the temperature and hence the viscosity of the polymer resin. Chiller 55 is placed between the polymer reserve 54 and the pump 56 that provides a metered flow of polymer resin to trough 35. The overflow is returned to temperature control unit 55.

Figure 6A:
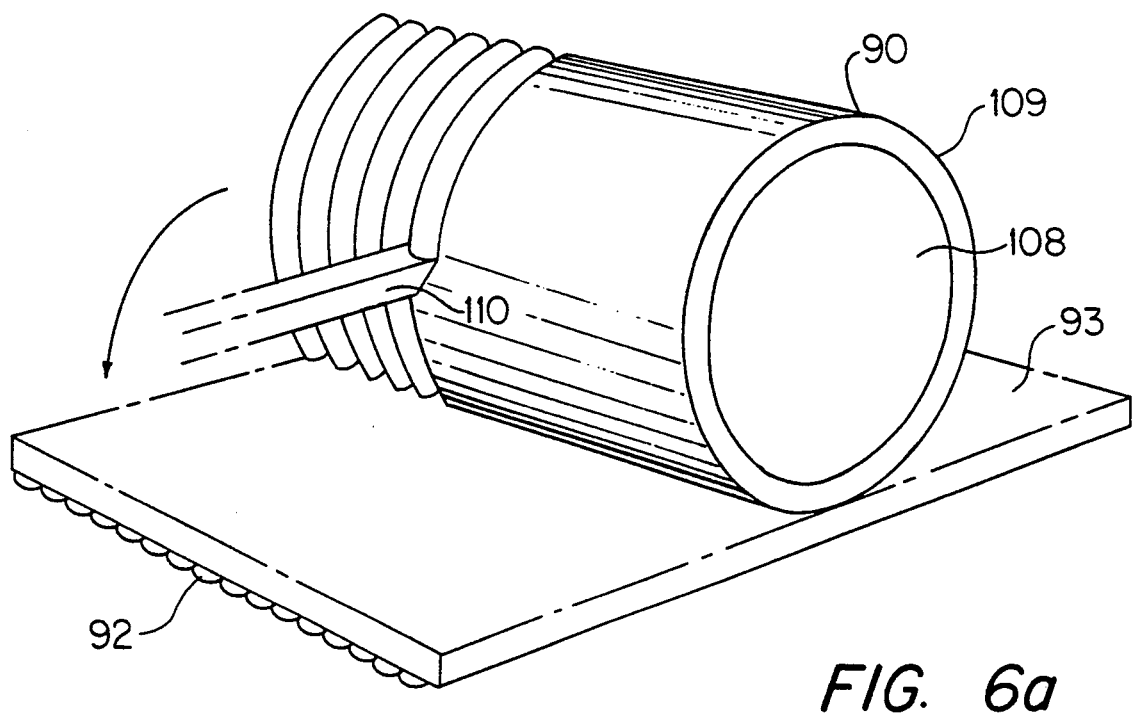
FIG. 6a is a perspective view of a relief pattern being cut into a removable copper sleeve.

FIG. 6a is a perspective drawing of copper sleeve 109 mounted on cylinder 108. The circumference of cylinder 108 is equal to the length of the image area. The width of cylinder 108 is equal to the width of the lenticular surface. Copper sleeve 109 is formed by plating cylinder 108 with "0" grain copper having adequate thickness for surfacing and tooling to a depth of 0.5 mils to 3 mils.

A lathe (e.g., a computer manipulation controlled lathe) using a concave diamond tip tool 110 having the desired inner radius cuts the lenticular pattern into copper sleeve 109 mounted on cylinder 108 at the required line pitch 92. The inner radius of the concave diamond tip tool 110 matches the radius of the cylindrical lenticules. After it is hard-plated and polished, copper sleeve 109 is cut through its thickness 90 to retrieve a flat matrix 93 from which a polymer "mother" reproduction 94 can be made. This replication becomes relief pattern 22 used on the web press of FIG. 4 (shown in perspective view in FIG. 12) or on cylinder 4 of FIG. 5 (shown in perspective view in FIG. 11).

Figure 6B:
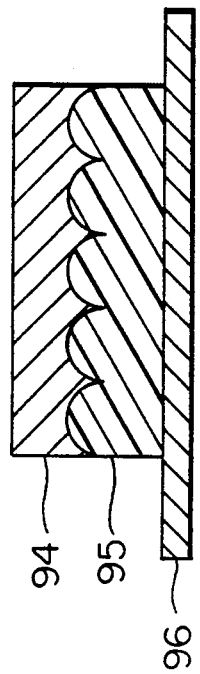
FIG. 6b is a cross-sectional schematic of a master copper relief pattern and a replicated "mother" pattern formed or cast in a polymer layer bonded to a polycarbonate base film.

FIG. 6b shows how a "mother" pattern 94 can be used in place of a relief pattern formed into the glass cylinder. The "mother" pattern is then wrapped around the glass cylinder and clamped into position. Mother pattern 94 is formed by impressing a master copper relief pattern 93 into a polymer layer bonded to a polycarbonate base film 91. This method provides an inexpensive, easy change of the lenticular pattern to match a given position of image layout. If a "mother" pattern is used as the relief surface 22, it must be protected from the uncured polymer 20 by the use of a silicone liquid or wetting agent 28 applied to the relief surface 22 by rollers 29 and 30, as shown in FIG. 4.

The use of a CMC lathe on a copper cylinder to create the original lenticulation pattern is not the only method for making the relief pattern. Other methods for making this pattern may be used, such as stereo lithography or Erasable Optical Data Bump-Forming.

Optical Data Bump forming is described in U.S. Pat. Nos. 4,719,615; 4,852,075; 4,912,696; 4,780,867; 4,901,304; 4,825,430; and 4,896,314. The optical recording medium in these patents is a unique polymeric bump-forming medium. Bumps are recorded on the surface of the polymer film using a laser operating in the visible or near-infrared. It is capable of forming marks as small as 0.3 $\mu$m in diameter. The marks can be erased bit-by-bit using a laser of a second wavelength, or in sectors by heating the surface of the coating with an infrared source such as xenon flash lamp. The medium is produced by spin-coating dyed polymer layers onto a rigid substrate such as a polycarbonate disk, or by web-coating of the layers onto a flexible substrate such as PET. It can also be applied to coating rolls, drums or other rigid three-dimensional substrates.

There are two ways in which the optical recording medium can be used in 3D imaging. The first is in the production of lenticular screen materials. Current methods rely on metal dies which must be machined and then inserted into a mold for rigid lenticular screens or attached to a drum for flexible screens. Because of the small dimensions of the individual lenticles (often 32 lines/inch or smaller), machining costs are significant, and the cost of producing large screens (greater than 10×14 inches) makes large-scale reproduction and distribution prohibitively expensive. For flexible lenticular products, the situation is slightly better, but the cost of producing and mounting the master onto the machine is still a significant set-up expense.

The surface topography required for forming lenticles of nearly any dimension can be produced on the optical recording medium quickly and inexpensively using a laser operating under computer control. The energy required for exposure is considerably less than that for laser milling, so a relatively low-cost system can be used. For this operation the optical recording medium could be coated as a flat sheet on a rigid substrate (for insertion into a mold) or as a coating on a cylindrical drum. The flat sheet would be exposed to produce the required surface topography, then inserted into the mold. An acrylic sheet covered with a thin layer of photopolymer would be laminated to the master, then exposed through the acrylic to a UV light source. The photopolymer film in contact with the master would crosslink to form a negative reproduction of the master. The sheets would then be delaminated and the master would be reused.

For flexible lenticular materials, a drum coated with the optical recording medium layers would be mounted onto the printing line after the final print station. The surface topography required would be produced by exposing the drum either on the press or just before mounting. This would replace the machining process presently required to produce a master. The drum would be continuously coated with a thin layer of photopolymer which would conform to the surface of the drum. As the photopolymer was laminated to the print, it would be exposed to UV light to form a permanent lens on the surface of the print. If changes were required, either in the registration of the master with the print, or in the line spacing of the lenticular screen, the drum could be erased and re-exposed on the press. This would allow for rapid changes in print size and corrections for enlargement effects.

The second way in which the optical recording medium could be used is in the production and reproduction of holographic images. Because the optical recording medium forms surface marks with dimensions comparable to the wavelength of light, it could be used to replace dichromated gelatin in the production of holographic images. In addition, the optical recording medium could be used as a master for duplication of embossed holograms. It could be coated onto a drum and exposed to produce the desired image. A polyester sheet coated with a thin photopolymer film would then be laminated to the drum and exposed through the substrate to UV light. This would polymerize the coating, which would then be pulled off the drum continuously and wound up. The polyester film with the polymerized photopolymer coating would then be metallized and the resulting images cut out and mounted as required. This would greatly reduce the tooling costs in producing embossed holograms, since the image could be recorded on the drum with a laser, then erased without removing the drum from the coating machine. A separate master would no longer have to be machined for each print.

The optical recording medium is well-suited for both these imaging applications. It can be fabricated in large uniform sheets, then exposed to produce a wide range of surface topographies. It can be produced inexpensively, especially if visible dyes and lasers are used in image production. Since it can be erased, it can be reused readily, making it suitable for short-run production. Because of these characteristics, it has the potential to open up new areas of three-dimensional imaging.

FIG. 7a is a perspective drawing of a second preferred embodiment of the present invention, which uses a common lithographic offset press retrofitted with a flowable catalytic resin in trough 97. The resin flow is metered to a raised surface plate 98 wrapped around plate cylinder 99. The resin fills the cavities of the relief pattern 100 which is wrapped around the blanket cylinder 101. Cylinder 101 transfers the resin to substrate 104 at predetermined positions 105 and 106. The relief pattern is in registration with in-line printed complementary images 102 from prior press units. It is cured at the nip of cylinders 101 and 103 by a bank of UV lamps 107 extending the full width of the sheet. Unlike the first embodiment of FIGS. 4 and 5, there is no UV lamp inside the cylinder.

Figure 7B:
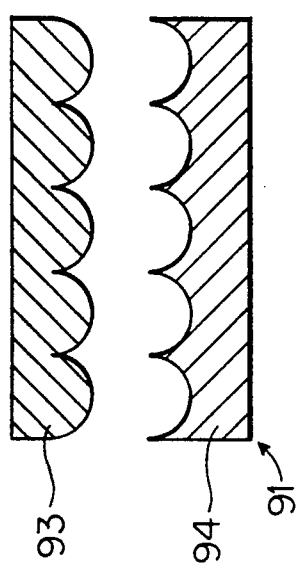
FIG. 7b is a cross-sectional schematic of the relief pattern forming the lenticules in the polymer resin.

FIG. 7b shows relief plate 94 forming the pattern of cured polymer 95 which is bonded at substrate 96 to produce the lenticular sheets. Substrate 104 may also be continuous length roll material, e.g., when a web printing press is utilized.

Figure 8:
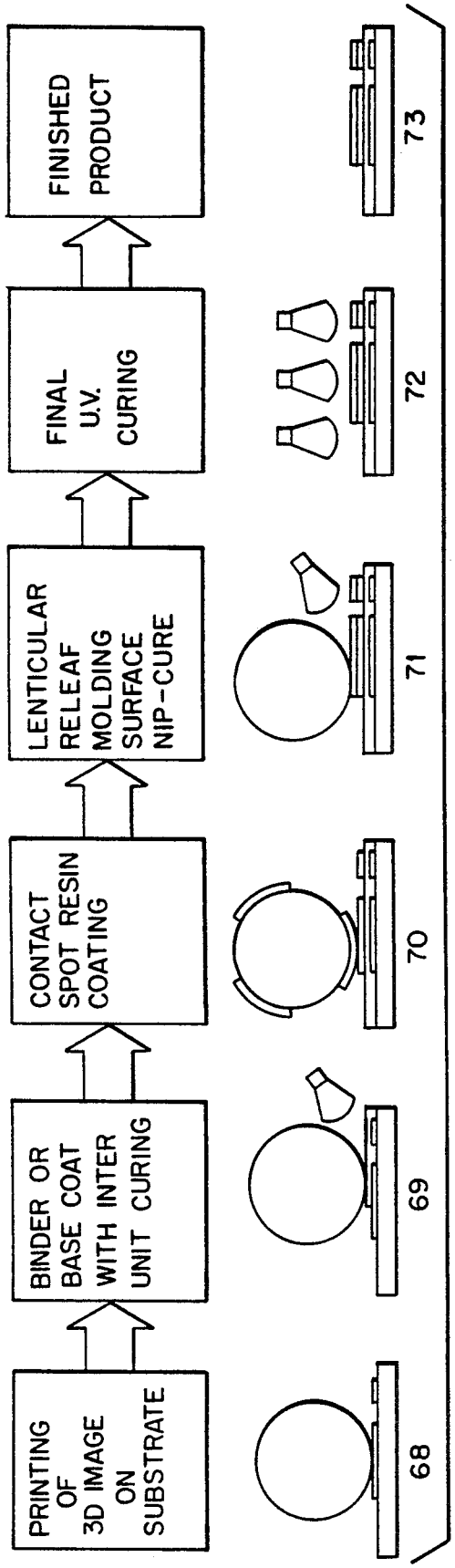
FIG. 8 is an illustrated block diagram showing schematically the method of the present invention used with paper substrates on a sheet-fed press with conventional cylinders.

FIG. 8 is a schematic representation of the process of the present invention, as shown in the embodiment of FIG. 7a, for making lenticular sheets using paper or opaque substrates and catalytic polymer chemistry. In this embodiment, the UV lamp is outside the cylinder having the lenticular relief pattern. Each process step in FIG. 8 is denoted by a step number 68–73. The process starts at step 68 where three-dimensional images are printed onto a substrate. The images can be made as full color lithographic separation films using any of a number of conventional methods. For example, three-dimensional images can be obtained by direct photography using a special three-dimensional camera.

Such cameras generally have a motorized film back with a barrier strip or lenticulated overlaid mask that is driven the width of a single lenticule during the full left to right movement of the film back. A small aperture or slit at the rear of the lens is synchronized with the other elements to produce a continuum of perspective images within a single lenticule at a prescribed pitch determined by the masking element. Negatives are generally exposed from still-life compositions and contact-printed to a positive transparency. The transparency can be used as the master for separation, or duplicated for mounting to a comparable mask (i.e., barrier strip or lenticular grid) for viewing.

An alternative method is discontinuous photography. Discontinuous photography uses conventional cameras to expose a number of individual images at different perspectives with left to right movement of the camera, or an array of cameras mounted in alignment with synchronized shutters so that all exposures are made simultaneously. In some cases, a motion picture camera is traversed from left to right on a motor-driven rail to photograph the discontinuous individual frames, thus producing the different perspectives required for autostereography.

All discontinuous photography methods require the images to be superimposed into a single lenticulated transparency by use of a combining device that imposes each frame adjacent to the next within each lenticule width at the desired pitch. These photo-mechanical combined image masters can be used with barrier-strips or lenticular screens. These are then mounted to their respective barrier strips or lenticular screens having the same pitch, with a slight correction for viewing parallax. The master photo-combined lenticulated film is also used as input for the making of lithographic separations.

Discontinuous photography can also be scanned and digitized for combination on a computer by interlacing the images for direct output at selected pitch on a graphic arts scanner output device. This process is described in U.S. Pat. No. 5,113,213.

Once the separations and lithographic plates are made conventional methods are used to print the image on paper as shown in FIG. 8 at step 68. Depending on the type of sheet used, a binder coating of an aqueous acrylic may be used to size the sheet, and prepare the surface to accept the thermosetting resin.

After the sheet is coated with the polymer resin, the patterned relief molding surface is pressed onto the polymer resin coating. The polymer resin completely fills the cavities in the molding surface under the applied pressure, while maintaining the desired coating thickness. The resin is then exposed at the nip of the cylinder to a curing agent (i.e., UV lamps) to cure and harden the resin. The resin retains its shape and bonds to the precoats of uncured resin as shown at step 71. Additional UV curing may be provided at step 72. The finished product is stacked at step 73.

Figure 9:
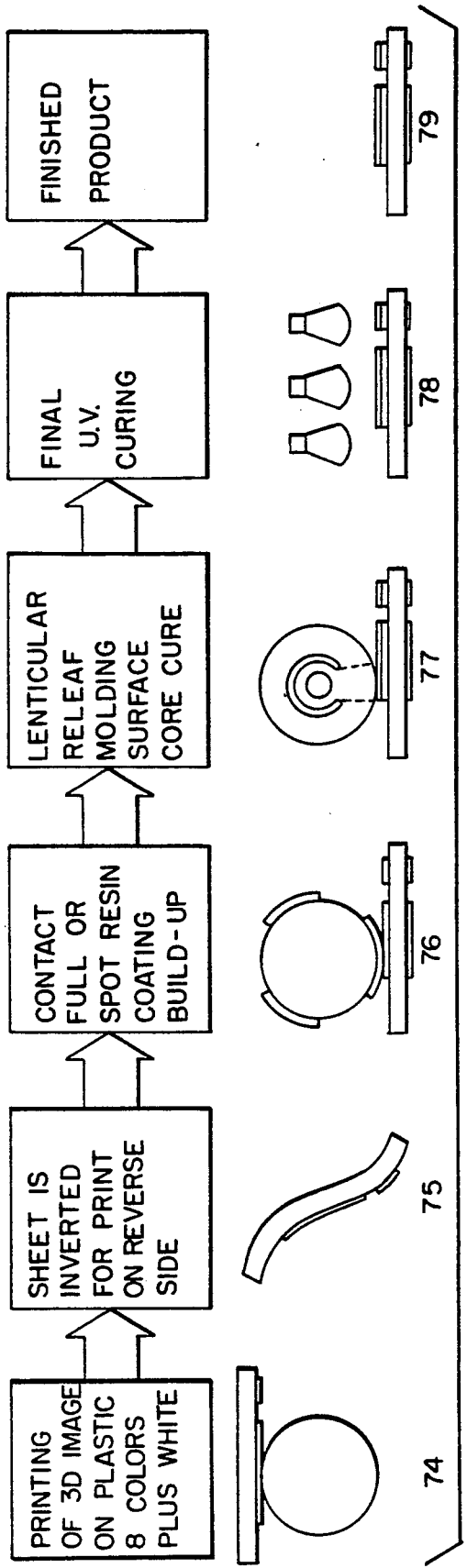
FIG. 9 is an illustrated block diagram showing schematically the method of the present invention used with plastic substrates on a sheet-fed press with a transparent cylinder containing a UV light source.

FIG. 9 is a schematic representation of a process for making lenticular sheets according to the present invention using transparent plastic substrates. The clear polycarbonate or polyethylene substrate sheet is less than 20 mils thick. A three-dimensional image is printed on the back side of the sheet in four color process inks.

As in any lithographed product designed for backlighting, the second impression increases the image saturation to retain the brilliance of the image at high light levels. In order for the sheet to be translucent rather than transparent, one or two impressions of white are applied over the process colors to act as a diffuser in step 74, or as a reflective surface 16 (as shown in FIG. 3).

The substrate may require a paper tip-sheet to obtain proper feed and control.

If a tip-sheet is used, it would have to be removed as the sheet is inverted for processing of the lenticular layer on the opposite side of the sheet at step 75. With the thickness of the plastic sheet making up much of the lenticule's focal length, only a thin layer of thermosetting polymer is needed. This layer can be applied to the overall sheet or only in the image areas by spot coating, as previously explained, at step 76. As described above with respect to FIG. 8, the relief molding surface with the lenticular design is then pressed against the uncured resin and cured with UV lamps at step 77. Additional curing may be provided by auxiliary UV lamps at step 78.

Figure 10:
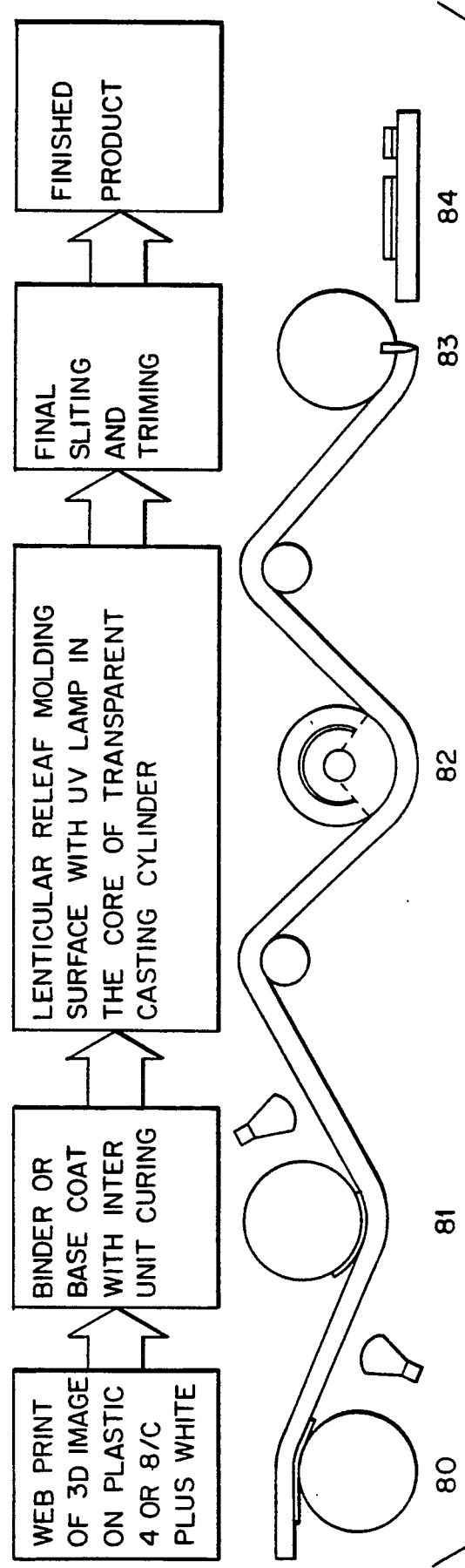
FIG. 10 is an illustrated block diagram showing schematically the method of the present invention used with plastic substrates on a web press equipped with a transparent cylinder containing a UV light source.

FIG. 10 is a schematic representation of a process for making lenticular sheets according to the present invention using a web press and paper or plastic substrates. If dimensional images are printed on the back side of a transparent substrate as shown in step 80, the ink can be dried in-line by UV or IR lamps. A base coat can be applied to the opposite side, if needed, as shown in step 81. UV polymer is added and cured by a UV lamp within a transparent cylinder at step 82 as previously described in the detailed description of FIG. 4. The web can then be slit and trimmed to sheet size at step 83 and delivered as finished product at step 84.

The thermosetting resin suitable for use in forming the transparent outer layer of the lenticular screen is a reactive polymer capable of being polymerized by UV radiation, and a reactive monomer which serves as a diluent for the reactive polymer and facilitates control over viscosity. Viscosity can also be controlled by temperature. The typical temperature range of the polymer is 50° to 90° F. Additionally, the resin may include a cure initiator, dyes, pigments and conventional additives such as gloss, leveling, flow or wetting agents and adhesion promoters. The radiation source may be directed through the molding substrate in contact with the resin in the case of clear plastic sheets but must be directed to the top surface of the resin and as close to the cylinder nip as possible when using paper.

Examples of reactive polymers suitable for use in radiation curable resin systems include acrylic based polymers derived from epoxies, urethanes, polyesters, and polyethers. The preferred type of reactive polymer for use in this invention is an acrylated urethane polyester oligomer, such a UVITHANE 893, an aliphatic diisocyanate based urethane oligomer having a molecular weight of about 1300. This oligomer is a product of the Morton International, Inc. Chemical Division, Woodstock, Ill.

The reactive diluent monomer preferably comprises one or more reactive mono-, di-or-poly-functional acrylic monomers, examples of which include pentaerythritol triacrylate, tri-methylolpropane triacrylate, hexanediol diacrylate, tetraethylene glycol diacrylate, isobornyl acrylate. The acrylate monomers serve as a solvent for the reactive polymer and are added to the polymer in varying amounts to obtain a formulation with the desired viscosity for obtaining the particular coating thickness desired. However, unlike conventional solvents, these monomers become chemically incorporated into the coating layer by polymerization.

The press polymerization process may be applied to other sorts of optical elements useful in three-dimensional and multi-imaging printing. For example, rectangular or cylindrical arrays of lenslets may be imprinted by using an appropriately constructed impression cylinder.

The lenticular screens produced according to the present invention are unique because the image and the lenticular screen, whether the image is printed on a paper substrate or on a plastic substrate, are fused into a single unit. The polymer bonds to the substrate by U.V. radiation.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method of manufacturing autostereograms comprising:
   (a) providing a flexible substrate sheet having a stereographic image printed thereon;
   (b) wrapping the flexible substrate sheet partially around a transparent cylinder having a relief pattern, said relief pattern being an array of inverse lenticules, said printed stereographic image being aligned in precise registration with the array of inverse lenticules;
   (c) flowing a layer of thermosetting polymer resin between the flexible substrate sheet and the relief pattern on the cylinder, thus impressing an array of lenticules onto the layer of thermosetting polymer resin;
   (d) curing the layer of thermosetting polymer resin with ultraviolet radiation, said radiation emanating from a source within said cylinder; and
   (e) separating the cured layer of polymer resin, having the array of lenticles impressed therein, from the cylinder.

2. The method of manufacturing autostereograms of claim 1, wherein the relief pattern is an array of inverse cylindrical lenticules.

3. The method of manufacturing autostereograms of claim 2, wherein optical data bump forming techniques are used to manufacture the cylinder having the relief pattern of inverse cylindrical lenticules.

4. The method of manufacturing autostereograms of claim 1, wherein the relief pattern is a transparent mother relief pattern, said transparent mother relief pattern having been formed by impressing a master relief pattern in a layer of transparent polymer, and the mother relief pattern is wrapped around a transparent cylinder to provide the transparent cylinder having the relief pattern of inverse lenticules.

5. The method of manufacturing autostereograms of claim 1, wherein the relief pattern is a transparent mother relief pattern, said transparent mother relief pattern having been formed using optical data bump forming techniques.

6. The method of manufacturing autostereograms of claim 1, wherein the thermosetting polymer resin is applied to the relief pattern on the transparent cylinder using a tower coater.

7. The method of manufacturing autostereograms of claim 6, wherein the relief pattern is a transparent mother relief pattern, said mother relief pattern having been formed by impressing a master relief pattern in a layer of transparent polymer, and the mother relief pattern is wrapped around a transparent cylinder to provide the transparent cylinder having the relief pattern of inverse lenticules.

8. The method of manufacturing autostereograms of claim 6, wherein the relief pattern is a transparent mother relief pattern, said transparent mother relief pattern having been formed using optical data bump forming techniques.

9. A method of manufacturing autostereograms comprising:
   (a) providing a transparent cylinder having a relief pattern on its outer surface, said relief pattern being a lenticular relief pattern comprising an array of inverse lenticules, and said transparent cylinder having a source of ultraviolet radiation within the transparent cylinder;
   (b) wrapping a flexible substrate sheet partially around the transparent cylinder, said flexible substrate sheet having a stereographic image thereon, the image being in registration with the lenticular relief pattern on the transparent cylinder;
   (c) flowing a thermosetting polymer resin onto the transparent cylinder between the relief pattern and the flexible substrate sheet;
   (d) curing the thermosetting polymer resin in situ, and simultaneously bonding the polymer resin to the flexible substrate sheet while maintaining the registration between the flexible substrate sheet and the stereographic image, with ultraviolet radiation produced by the source of ultraviolet radiation within the transparent cylinder thus producing a composite lenticular sheet having an array of lenticules on its front surface and a stereographic image; and
   (e) removing the composite lenticular sheet.

10. The method of manufacturing autostereograms of claim 9, wherein the relief pattern is an array of inverse cylindrical lenticules.

11. The method of manufacturing autostereograms of claim 10, wherein optical data bump forming techniques are used to manufacture the cylinder having the relief pattern of inverse cylindrical lenticules.

12. The method of manufacturing autostereograms of claim 10, wherein the relief pattern is a transparent mother relief pattern, said transparent mother relief pattern having been formed by impressing a master relief pattern in a layer of transparent polymer, and the mother relief pattern is wrapped around a transparent cylinder to provide the transparent cylinder having the relief pattern of inverse lenticules.

13. The method of manufacturing autostereograms of claim 9, wherein the relief pattern is a mother relief pattern, said mother relief pattern having been formed using optical data bump forming techniques.

14. The method of manufacturing autostereograms of claim 9, wherein the thermosetting polymer resin is applied to the relief pattern on the cylinder using a tower coater.

15. An apparatus for fabricating lenticular sheet autostereograms comprising:
   (a) computer means for combining planar images of an object into a combined image, each of the planar images being a view of the object from one of a plurality of different viewpoints;

(b) printer means for printing the combined image onto a flexible substrate;

(c) a transparent cylinder comprising a lenticular relief pattern on its outer surface, said lenticular relief pattern comprising an array of inverse lenticules;

(d) means for wrapping said flexible substrate partially around said transparent cylinder such that the combined image is in registration with the lenticular relief pattern;

(e) means for providing a metered flow of ultraviolet-curable thermosetting polymer resin onto the lenticular relief pattern and depositing a layer of polymer resin between the lenticular relief pattern and the flexible substrate;

(f) means for controlling the thickness of the layer of polymer resin; and (g) means for producing ultraviolet radiation, said means being positioned within said transparent cylinder such that at least some of the ultraviolet radiation is incident upon the thermosetting polymer resin, the ultraviolet radiation having the characteristics necessary for curing and hardening the polymer layer and bonding the polymer layer to the flexible substrate such that the combined image remains in registration with the lenticular pattern.

16. The apparatus for fabricating autostereograms of claim 15, wherein the relief pattern is an array of inverse cylindrical lenticules.

17. The apparatus for fabricating autostereograms of claim 16, wherein optical data bump forming techniques are used to manufacture the cylinder having the relief pattern of inverse cylindrical lenticules.

18. The apparatus for fabricating autostereograms of claim 15, wherein the relief pattern is a transparent mother relief pattern, said transparent mother relief pattern having been formed by impressing a master relief pattern in a layer of transparent polymer, and the mother relief pattern is wrapped around a transparent cylinder to provide the transparent cylinder having the relief pattern of inverse lenticules.

19. The apparatus for fabricating autostereograms of claim 15, wherein the relief pattern is a mother relief pattern, said mother relief pattern having been formed using optical data bump forming techniques.

20. The apparatus for fabricating autostereograms of claim 15, wherein the thermosetting polymer resin is applied to the relief pattern on the cylinder using a tower coater.

21. An apparatus for fabricating lenticular sheet autostereograms comprising:

(a) a transparent cylinder having a lenticular relief pattern on its outer surface, said lenticular relief pattern comprising an array of inverse lenticules;

(b) means within the transparent cylinder for producing ultraviolet radiation;

(c) means for wrapping a flexible substrate having a stereographic image thereon partially around said transparent cylinder such that the stereographic image is in registration with the lenticular relief pattern;

(d) means for providing a metered flow of ultraviolet-curable thermosetting polymer resin onto the lenticular relief pattern and depositing a layer of polymer resin between the lenticular relief pattern and the flexible substrate;

(e) means for controlling the thickness of the layer of polymer resin;

(f) means for directing the ultraviolet radiation at the layer of polymer resin such that the ultraviolet radiation cures and hardens the layer of polymer resin and bonds the flexible substrate to the layer of polymer resin such that the stereographic image remains in registration with the lenticular pattern, thus producing a composite lenticular sheet; and (g) means for separating the composite lenticular sheet from the transparent cylinder.

22. The apparatus for fabricating autostereograms of claim 21, wherein the relief pattern is an array of inverse cylindrical lenticules.

23. The apparatus for fabricating autostereograms of claim 22, wherein optical data bump forming techniques are used to manufacture the cylinder having the relief pattern of inverse cylindrical lenticules.

24. The apparatus for fabricating autostereograms of claim 21, wherein the relief pattern is a transparent mother relief pattern, said transparent mother relief pattern having been formed by impressing a master relief pattern in a layer of transparent polymer, and the mother relief pattern is wrapped around a transparent cylinder to provide the transparent cylinder having the relief pattern of inverse lenticules.

25. The apparatus for fabricating autostereograms of claim 21, wherein the relief pattern is a mother relief pattern, said mother relief pattern having been formed using optical data bump forming techniques.

26. The apparatus for fabricating autostereograms of claim 21, wherein the thermosetting polymer resin is applied to the relief pattern on the cylinder using a tower coater.

27. An apparatus for fabricating lenticular sheet autostereograms comprising:

(a) printer means for printing an autostereographic image onto a flexible substrate;

(b) a transparent cylinder comprising a lenticular relief pattern on its outer surface, said lenticular relief pattern comprising an array of inverse lenticules;

(c) means for wrapping said flexible substrate partially around said transparent cylinder such that the autostereographic image is in registration with the lenticular relief pattern;

(d) means for providing a metered flow of ultraviolet-curable thermosetting polymer resin onto the lenticular relief pattern and depositing a layer of polymer resin between the lenticular relief pattern and the flexible substrate;

(e) means for controlling the thickness of the layer of polymer resin; and (f) means for producing ultraviolet radiation, said means being positioned within said transparent cylinder such that at least some of the ultraviolet radiation is incident upon the thermosetting polymer resin, the ultraviolet radiation having the characteristics necessary for curing and hardening the polymer layer and bonding the polymer layer to the flexible substrate such that the autostereographic image remains in registration with the lenticular pattern.

28. The apparatus for fabricating autostereograms of claim 27, wherein the relief pattern is an array of inverse cylindrical lenticules.

29. The apparatus for fabricating autostereograms of claim 28, wherein optical data bump forming techniques are used to manufacture the transparent cylinder having the relief pattern of inverse cylindrical lenticules.

30. The apparatus for fabricating autostereograms of claim 27, wherein the relief pattern is a transparent mother relief pattern, said transparent mother relief pattern having been formed by impressing a master relief pattern in a layer of transparent polymer, and the transparent mother relief pattern is wrapped around a cylinder to provide the transparent cylinder having the relief pattern of inverse lenticules.

31. The apparatus for fabricating autostereograms of claim 27, wherein the relief pattern is a mother relief pattern, said mother relief pattern having been formed using optical data bump forming techniques.

32. The apparatus for fabricating autostereograms of claim 27, wherein the thermosetting polymer resin is applied to the relief pattern on the cylinder using a tower coater.

33. The apparatus of claim 32, wherein the relief pattern is an array of inverse cylindrical lenticules.

34. The apparatus of claim 22, wherein the relief pattern is a transparent mother relief pattern, said transparent mother relief pattern having been formed by impressing a master relief pattern in a layer of transparent polymer, and the transparent mother relief pattern is wrapped around a cylinder to provide the transparent cylinder having the relief pattern of inverse lenticules.

* * * * *